United States Patent [19]

Inoue

[11] 4,044,368
[45] Aug. 23, 1977

[54] HIGH SPEED EXPOSURE TIME CONTROL MEANS FOR FOCAL PLANE SHUTTERS

[75] Inventor: Nobuyoshi Inoue, Kawagoe, Japan

[73] Assignee: Copal Company Limited, Japan

[21] Appl. No.: 678,437

[22] Filed: Apr. 19, 1976

[30] Foreign Application Priority Data

Apr. 21, 1975 Japan .............................. 50-47489

[51] Int. Cl.$^2$ ............................................ G03B 17/38
[52] U.S. Cl. .................................................... 354/267
[58] Field of Search ............... 354/226, 241, 242, 246, 354/248, 249, 261, 262, 266, 267, 268

[56] References Cited

U.S. PATENT DOCUMENTS 3,507,202  4/1970  Prochnow ........................... 354/242
3,984,848  10/1976  Akiyama et al. ................ 354/266 X

FOREIGN PATENT DOCUMENTS 24,337  11/1963  Japan ................................... 354/249

*Primary Examiner*—Donald A. Griffin
*Attorney, Agent, or Firm*—Cushman, Darby & Cushman

[57] ABSTRACT

A high speed exposure time control means for focal plane shutters wherein, in order that an always accurate high speed exposure time may be obtained, a rear blade actuating member is so made as to be released after the lapse of a fixed time from the time of the shutter release and the time interval from the time of the shutter release to the time when a front blade actuating member is released is so made as to be varied by setting the exposure time.

3 Claims, 3 Drawing Figures

HIGH SPEED EXPOSURE TIME CONTROL MEANS FOR FOCAL PLANE SHUTTERS

BACKGROUND OF THE INVENTION a. Field of the Invention:

The present invention relates to focal plane shutters, and more particularly, to improvements in a high speed exposure time control means adapted to focal plane shutters.

b. Description of the Prior Art:

Generally an exposure time control means for focal plane shutters comprises a high speed exposure time controlling mechanism for forming an exposure slit with shutter blades or shutter curtains and a low speed exposure time controlling mechanism for controlling the fully opened time of the shutter blades or shutter curtains.

Now, according to the conventional high speed exposure time controlling mechanism, in the relations of the front blade (curtain) actuating member, the rear blade (curtain) actuating member and the high speed exposure time controlling member releasing in turn both actuating members in the cocked state by its displacing motion, the time of releasing the front blade (curtain) actuating member is so set as to be always constant and the time of releasing the rear blade (curtain) actuating member is so made as to be varied with the setting of the exposure time.

That is to say, in FIG. 1, the reference symbol $\gamma$ shows an example of a variation characteristic of the time to rotation angle of a high speed exposure time controlling member (actuating cam). The angular velocity of the rotation of the actuating cam started by the shutter release is small in the initial period but becomes gradually larger.

The specific displacement position $a$ of the actuating cam is made the front blade (curtain) actuating member releasing position, the positions $b$, $c$ and $d$ are made the rear blade (curtain) actuating member releasing positions and, for example, the time $t_3$ shows 4 ms (1/250 sec.), the time $t_2$ shows $t_3/2$ or 2 ms (1/500 sec.) and the time $t_1$ shows $t_2/2$ or 1 ms (1/1000 sec.).

On the other hand, in case the rotation angle $\theta_3$ of the actuating cam corresponding to the time $t_3$ is made a basis, the rotation angle $\theta_2$ will not be $\theta_3/2$ but $\theta_2 < \theta_3/2$. Needless to say, the rotation angle $\theta_1$ will not be $\theta_2/2$ but $\theta_1 < \theta_2/2$ and $\theta_1 < \theta_3/4$.

This means that the displacement of the actuating cam from the time point of release of the front blade (curtain) actuating member at the time of the maximum speed, for example, of 1/1000 sec. to the time point of release of the rear blade (curtain) actuating member is small and has been a cause of making the maximum speed exposure time unstable in the conventional means.

SUMMARY OF THE INVENTION

An object of the present invention is to provide a high speed exposure time control means for focal plane shutters wherein, in order to eliminate the above mentioned defects of the conventional product, the rear blade (curtain) actuating member is so made as to be released in a fixed displacement position near the final section of the high speed exposure time controlling member (actuating cam) displacing motion and the time point of releasing the front blade (curtain) actuating member is so made as to be varied with the setting of the exposure time.

DESCRIPTION OF THE PREFERRED EMBODIMENT

Figure 1:
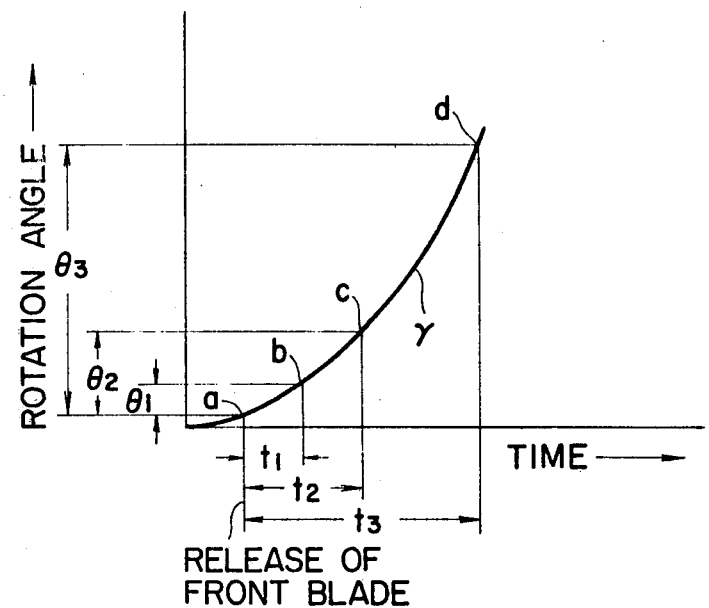
FIG. 1 is an explanatory diagram for explaining the operation characteristic of an actuating cam in a conventional exposure time control means.
Figure 2:
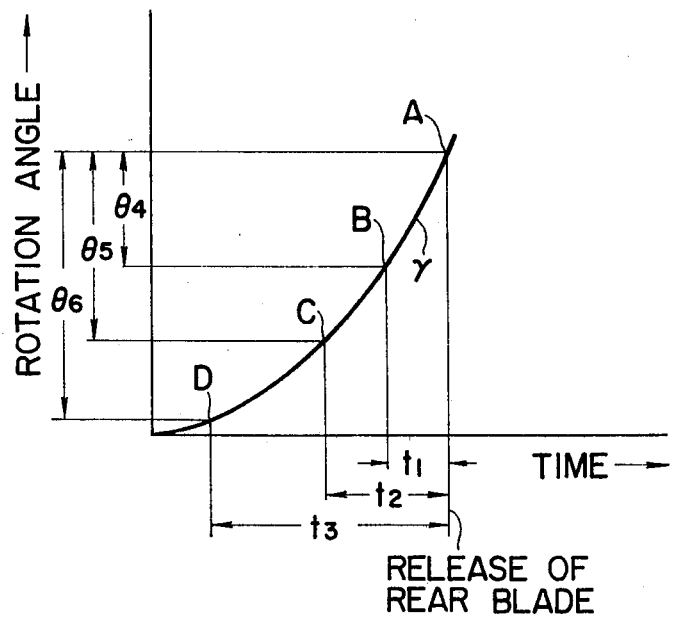
FIG. 2 is an explanatory diagram for explaining the operation characteristic of an actuating cam in an exposure time control means according to the present invention.

FIG. 2 shows the operation characteristic of an actuating cam in an exposure time control means according to the present invention. As evident from this diagram, according to the present invention, a rear blade actuating member is released in a fixed displacement position A of an actuating cam near the final section of the operation of the actuating cam and a front blade actuating member is released in a displacement position of the actuating cam shown by the reference symbol B, C or D in response to the setting of the exposure time. For example, $t_3$ shows 4 ms (1/250 sec.), $t_2$ shows $t_3/2$ or 2 ms (1/500 sec.) and $t_1$ shows $t_2/2$ or 1 ms (1/1000 sec.).

On the other hand, in case the rotation angle $\theta_6$ of the actuating cam in the case of the time $t_3$ is made a basis, $\theta_5 > \theta_6/2$ and $\theta_4 > \theta_5/2$ or $\theta_4 > \theta_6/4$.

This means that the displacement of the actuating cam from the release of the front blade actuating member at the time of the maximum speed, for example, of 1/1000 sec. to the release of the rear blade actuating member can be made large and that a stabilized maximum speed exposure time can be obtained.

An embodiment of the present invention shall be explained with reference of FIG. 3 in the following.

Reference numeral 1 signifies a release lever pivoted to a shaft 2 provided on a base plate P, made counterclockwise rotatable by a spring 3 and forming an operating arm 1a and a locking end surface 1b. Reference numeral 4 signifies an actuating cam pivoted to a shaft 5 provided on the base plate P, made clockwise rotatable by a spring 6 and forming a hook 4a lockable on the end surface 1b of the release lever 1 and a cam surface 4b. Reference numeral 7 signifies a speed changing cam pivoted to a shaft 8 provided on a member integral with the base plate P and forming step cams 7a, 7b and 7c. The speed changing cam 7 is shown as partly cut-off and is rotated by a well known shutter speed setting dial (not illustrated). Reference numeral 9 signifies a high speed switching lever pivoted to a shaft 10 on the base plate P and made counterclockwise rotatable by a spring 11. A supporting shaft 9a to engage in contact with the step cam 7a (7b or 7c) of the speed changing cam 7 is erected on the high speed switching lever 9. Reference numeral 12 signifies a high speed operating lever pivoted to the supporting shaft 9a of the high speed switching lever 9. A pin 12a to be pushed and moved by the cam surface 4b of the actuating cam 4 and another pin 12b are erected on the high speed operating lever 12. Reference numeral 13 signifies a front blade operating lever pivoted to the shaft 5 and made clockwise rotatable by a spring 14. On the front blade operating lever 13, a slot 13a to fit the pin 12b of the high speed operating lever 12 is formed and a pin 13b is erected. Reference numeral 15 signifies a front blade locking lever pivoted to a shaft 16 on the base plate P, made counterclockwise rotatable by a spring 17 and forming an arm 15a to be pushed and moved by the pin 13b of the front blade operating lever 13 and a bend 15b. Reference numeral 18 signifies a rear blade operating lever pivoted to a shaft 19 on the base plate P and made clockwise rotatable by a spring 20, forming an arm 18a which can be beaten by the hook 4a in a fixed rotation position near the final section of the clockwise rotating motion of the actuating cam 4 and having a pin 18b erected on it. Reference numeral 21 signifies a rear blade locking lever pivoted to a shaft 22 on the base plate P, made counterclockwise rotatable by a spring 23 and forming a bend 21a which can be pushed and moved by the pin 18b of the rear blade operating lever 18 and another bend 21b. Reference numeral 24 signifies a front blade actuating lever pivoted to a shaft 25 on the base plate P, made counterclockwise rotatable by a spring 26, forming a hook 24a to be locked on the bend 15b of the front blade locking lever 15 and having a pin 24b to actuate a front blade group not illustrated erected on it. Reference numeral 27 signifies a rear blade actuating lever pivoted to a shaft 28 on the base plate P, made counterclockwise rotatable by a spring 29, forming a hook 27a to be locked on the bend 21b of the rear blade locking lever 21 and having a pin 27b to actuate a rear blade group not illustrated erected on it. Reference numerals 30 to 35 signify stopper pins provided on the base plate P. Particularly the pin 31 is positioned in the track of the hook 4a through the arm 18a of the rear blade operating lever 18 so as to serve to restrict the clockwise rotation of the actuating cam 4.

By the way, stopper pins for the front blade actuating lever 24 and rear blade actuating lever 27 are omitted. Further, a low speed exposure time controlling mechanism for controlling the fully opened condition of the shutter blades is also omitted.

Figure 3:
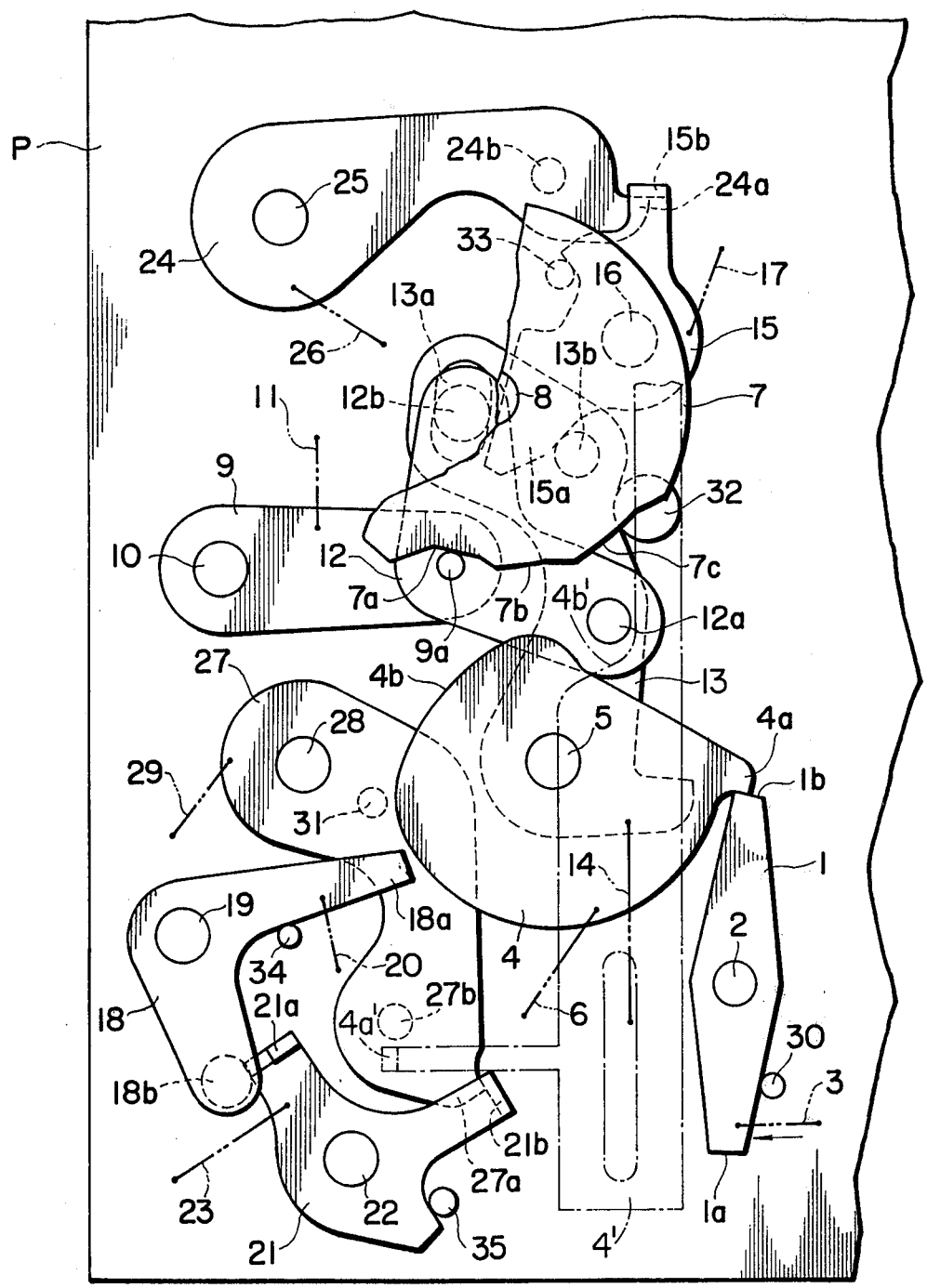
FIG. 3 is a constitutional view showing an embodiment of the high speed exposure time control means according to the present invention.

An exposure aperture is formed on the base plate P on the right side in FIG. 3. In the cocked state, the front blade group not illustrated actuated by the pin 24b of the front blade actuating lever 24 is expanded to cover the exposure aperture and the rear blade group not illustrated actuated by the pin 27b of the rear blade actuating lever 27 remains folded on one side of the exposure aperture. These can be more definitely understood by referring, for example, to U.S. Pat. Nos. 3,925,799 and 3,927,416 and U.S. patent application Ser. No. 501,617 filed on Aug. 29, 1974.

The operation of the above mentioned means shall be explained in the following.

When the release button (not illustrated) of the camera is pushed in the illustrated cocked state, the operating arm 1a will be pushed in the direction indicated by the arrow, the release lever 1 will rotate clockwise against the tension of the spring 3 and the end surface 1b will be unlocked from the hook 4a. Therefore, the actuating lever 4 will be rotated clockwise by the tension of the spring 6, will first push and move the pin 12a with the cam surface 4b and will rotate counterclockwise the high speed operating lever 12 around the supporting shaft 9a on the high speed switching lever 9. Further, simultaneously with this counterclockwise rotation, the front blade operating lever 13 will be rotated counterclockwise against the tension of the spring 14 around the shaft 5. By the counterclockwise rotation of the front blade operating lever 13, the arm 15a will be pushed and moved by the pin 13b, the front blade locking lever 15 will rotate clockwise against the tension of the spring 17 and the bend 15b will be unlocked from the hook 24a. As a result, the front blade actuating lever 24 will be rotated counterclockwise by the tension of the spring 26, will run the front blade group not illustrated and will open the exposure aperture.

On the other hand, by the clockwise rotation of the actuating lever 4, then the hook 4a will beat the arm 18a to rotate counterclockwise the rear blade operating lever 18 against the tension of the spring 20. By its counterclockwise rotation, the rear blade operating lever 18 will push and move the bend 21a with the pin 18b, will rotate clockwise the rear blade locking lever 21 against the tension of the spring 23 and will unlock the bend 21b from the hook 27a. As a result, the rear blade actuating lever 27 will be rotated counterclockwise by the tension of the spring 29, will run the rear blade group not illustrated and will close the exposure aperture. Thus one exposure will be completed. Then, in order to bring the shutter mechanism to the illustrated cocked state, the actuating cam 4 may be rotated counterclockwise to lock the hook 4a on the end surface 1b of the release lever 1 and the front blade actuating lever 24 and rear blade actuating lever 27 may be rotated clockwise to respectively lock the hooks 24a and 27a on the bends 15b and 21b of the front blade locking lever 15 and rear blade locking lever 21.

The exposure time in the high speed range is set by the rotating operation of a shutter speed setting dial not illustrated. That is to say, by the rotation of said dial, the speed changing cam 7 will be rotated. When the speed changing cam 7 is rotated clockwise from the illustrated position, the supporting shaft 9a will be pushed down by the step cam 7b (7c) and the speed switching lever 9 will be rotated clockwise against the tension of the spring 11. As a result, the high speed operating lever 12 pivoted to the supporting shaft 9a on the lever 9 will lower while keeping the illustrated posture due to the movement of the pin 12b in the slot 13a of the front blade operating lever 13 and the pin 12a will advance deep into the track of the cam surface 4b of the actuating cam 4. Therefore, in the case of the clockwise rotation of the actuating cam 4, the time point when the rear blade operating lever 18 is rotated counterclockwise will be constant but the time point when the front blade operating lever 13 is rotated counterclockwise through the high speed operating lever 12 will be varied in response to the shutter speed or exposure time to be set.

By the way, in the embodiment, the actuating cam is shown as of a rotating type but may be of a linearly moving type as shown by the onepoint chain line in FIG. 3. That is to say, a sliding plate 4' as shown by the one-point chain line in FIG. 3 may be used instead of the actuating cam 4. The sliding plate 4' is supported linearly slidably on the base plate P by the pin-slot connection and has an arm 4a' engageable with the pin 12a of the high speed operating lever 12. The sliding plate 4' is biased upwards by a spring not illustrated and adapted to be locked in the illustrated position by the release lever 1 when the shutter is cocked. Therefore, when the release lever 1 is operated, the sliding plate 4' can move the high speed operating lever 12 and rear blade operating lever 18 in the same manner as by the actuating cam 4. It is needless to say that the present means can be applied also to curtain type focal plane shutters.

I claim:

1. A high speed exposure time control means for focal plane shutters comprising a base plate, a high speed exposure time controlling member mounted on said base plate so as to be able to move between its cocked position and uncocked position, a high speed switching lever supported rotatably on said base plate and supporting rotatably thereon a high speed operating lever engageable with said high speed exposure time controlling member, a front blade operating lever supported rotatably on said base plate and pin-slot connected with said high speed operating lever, a speed changing cam engageable with said high speed operating lever to change relative positions of said high speed exposure time controlling member and high speed operating lever, and a rear blade operating lever supported rotatably on said base plate and engageable with said high speed exposure time controlling member, said high speed operating lever being so arranged with respect to said high speed exposure time controlling member that engaging time of said high speed operating lever and high speed exposure time controlling member may vary in response to set position of said speed changing cam, and said rear blade operating lever being so arranged with respect to said high speed exposure time controlling member that engagement of said rear blade operating lever and high speed exposure time controlling member with each other may take place when a fixed time has elapsed after starting of said high speed exposure time controlling member.

2. A high speed exposure time control means according to claim 1, in which said high speed exposure time controlling member is a rotary plate supported rotatably on said base plate and having a cam formed in its peripheral edge portion.

3. A high speed exposure time control means according to claim 1, in which said high speed exposure time controlling member is a sliding plate supported linearly slidably on said base plate and having a cam formed thereon.

* * * * *